A. A. AVERY.
Churn.
No. 62,992.  Patented March 19, 1867.
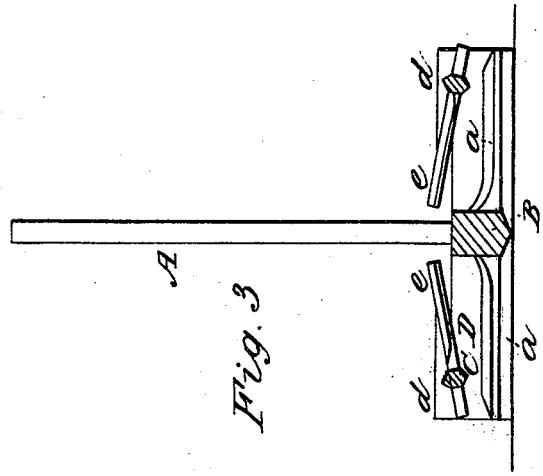
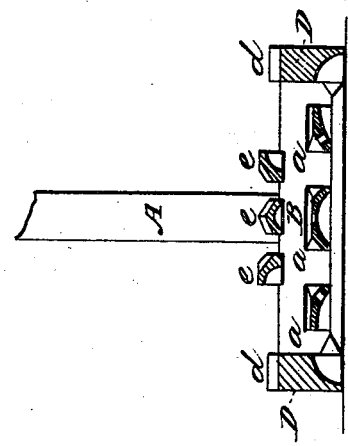
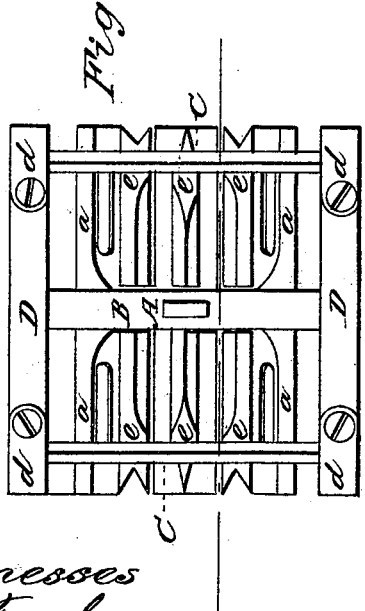
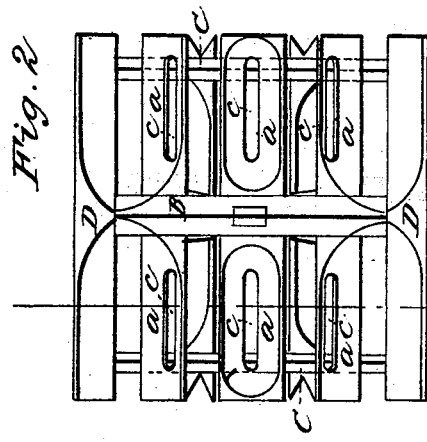
Witnesses
Theo Fusche
Wm Truxux
Inventor
A. A. Avery
Per
Attorney

United States Patent Office.

ANSON A. AVERY, OF CARDIFF, NEW YORK.

Letters Patent No. 62,992, dated March 19, 1867.

---

IMPROVEMENT IN CHURN-DASHER.

---

The Schedule referred to in these Letters Patent and making part of the same.

---

TO ALL WHOM IT MAY CONCERN:

Be it known that I, ANSON A. AVERY, of Cardiff, in the county of Onondaga, and State of New York, have invented a new and useful Improvement in Churn-Dashers; and I do hereby declare that the following is a full, clear, and exact description thereof, which will enable others skilled in the art to make and use the same, reference being had to the accompanying drawings, forming part of this specification, in which—

Figure 1 is a top view of my improved churn-dasher.

Figure 2 is a bottom view of my improved churn-dasher.

Figure 3 is a cross-section taken in the line $x\ x$, fig. 1.

Figure 4 is a cross-section taken in the line $y\ y$, fig. 2.

Similar letters of reference indicate like parts.

This invention relates to an improvement in churn-dashers, and consists in forming a dasher with a series of bars, fluted and slotted in such manner that the air is caught under and forced through them with the cream, so as to thoroughly intermingle in their passage through the bars, and thus produce the effect of an atmospheric churn upon the cream, bringing the butter quickly.

The handle A on one end is fastened to a cross-head, B, and on each end of this cross-head are fastened cross-beams, D D, the whole forming a strong square framework. On the under side of the dasher a series of broad fingers, $a\ a$, is fastened on both sides of the cross-head B, extending as far as the ends of the cross-beams D D. These fingers are fluted or concave on the lower side, as shown in fig. 4, the two outside fingers having their fluted surfaces in line with the curve of similar concave surfaces in the under side of the cross-beams D D, so as to form together regular arches. The middle finger is hollowed out like an inverted trough. In all the fingers $a\ a$ are slots, $c\ c$, fig. 2. On the upper side of the dasher movable cross-bars, C C, are let into recesses in the ends of the cross-beams D D, to which they are secured by buttons, $d\ d$. A series of fingers, $e\ e$, is attached to the cross-bars C C, pointing inward, and breaking joints over the lower fingers $a\ a$. They are also hollowed out on the lower side like the lower fingers. The upper set of fingers is made movable for the purpose of cleaning easily and thoroughly, and in the spring of the year, when butter is quickly made, they may be dispensed with, but in cool weather they promote the churning materially.

The dasher may be advantageously operated with a lever connected with the upper end if desired.

Having described my invention, I claim as new, and desire to secure by Letters Patent—

The slotted and fluted fingers $a\ a$ and $e\ e$, in combination with the cross-head B, and the cross-beams D D, arranged and operating substantially as herein described.

ANSON A. AVERY.

Witnesses:
GEORGE McINTIRE,
JOSEPH T. CARD.